United States Patent [19]

Hadley

[11] 4,018,725
[45] Apr. 19, 1977

[54] PHENOLIC FOAM PRODUCTS AND METHOD OF MAKING THE SAME

[75] Inventor: John F. Hadley, Bradford Woods, Pa.

[73] Assignee: H. H. Robertson Company, Pittsburgh, Pa.

[22] Filed: Aug. 9, 1976

[21] Appl. No.: 712,652

[52] U.S. Cl. .............................. 260/2.5 F; 260/838; 260/844
[51] Int. Cl.² .......................................... C08J 9/14
[58] Field of Search ................ 260/838, 844, 2.5 F

[56] References Cited

UNITED STATES PATENTS 2,606,935  8/1952  Martin ............................... 260/838
3,741,920  6/1973  Weissenfels et al. ............ 260/2.5 F

*Primary Examiner*—Morton Foelak
*Attorney, Agent, or Firm*—Harry B. Keck; George E. Manias

[57] ABSTRACT

Phenolic foam products are fabricated from phenol-aldehyde resol; a blowing agent; a condensation catalyst; a cell control agent; and an allyl ether of methylol-substituted phenol wherein the said allyl ether is present in a range from 0.5 to 25 percent by weight of the phenol-aldehyde resol. The function of the allyl ether is to overcome the extreme friability of the phenolic foam system.

2 Claims, No Drawings

PHENOLIC FOAM PRODUCTS AND METHOD OF MAKING THE SAME

CROSS-REFERENCES TO RELATED APPLICATIONS (IF ANY) —

None.

BACKGROUND OF THE INVENTION

1. Field of the Invention: The invention relates to phenol-aldehyde foams.

2. Description of the Prior Art: Phenolic foam compositions are described in U.S. Pat. No. 3,389,094 which discloses the general composition of such materials including a phenol-aldehyde resol, a condensation catalyst, a cell control agent and a haloalkane blowing agent. The patent also discloses the use of epoxy resins as additives for altering the properties of the resulting foams.

Other resinous materials have been added to phenol-aldehyde foam formulations for various purposes. For example, copolymers of fumaric acid diesters and vinyl aromatics (U.S. Pat. No. 3,862,912); acrylic esters, polyvinyl acetate, polyvinyl chloride (German application No. 1,769,927); unsaturated polyester resins or monomers (Canada Pat. No. 674,181); alkylene oxide adducts of phenol (U.S. Pat. No. 3,741,920); polyallyl compounds (U.K. Pat. No. 758,562); polyvinyl acetate; alcohol or acetal, e.g. polyvinyl butyral (U.K. 965,218); ethoxylated castor oil (U.S. Pat. No. 3,779,959) and certain thermosetting resins such as polyvinylals (U.S. Pat. No. 2,933,461).

SUMMARY OF THE INVENTION

Conventional phenol-aldehyde foam products, fabricated from phenol-aldehyde resol, a condensation catalyst, cellular control agents and halogenated alkane blowing agents are friable and this property is objectionable in some end-use applications. According to this invention friability of phenol-aldehyde foam products can be reduced to a point where it is not objectionable in some end-use applications by adding to the starting ingredients 0.5 to 15 percent by weight, based on the weight of the phenol-aldehyde resol, of allyl ether of methylol-substituted phenol.

The improvement is evident at all foam densities from about 1 p.c.f. to about 30 p.c.f., but is especially noticeable with the lower density foam products, i.e., from 1 to 5 p.c.f.

Allyl ether of methylol-substituted phenol is commercially available under the trademark Methylon 75108 from the General Electric Company. Its generic formula is

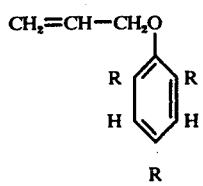

wherein one R is -CH$_2$OH and the other two R's are —H or —CH$_2$OH.

BRIEF DESCRIPTION OF THE DRAWINGS

There are no drawings.

DESCRIPTION OF THE PREFERRED EMBODIMENT(S)

The present foam products of reduced friability are obtained by combining the following ingredients.

| Parts by Weight | Ingredient |
|---|---|
| 1.0 | Phenol-aldehyde resol; |
| 0.005–0.25 | Allyl ether of methylol-substituted phenol; |
| 0.1–0.4 | Halogenated alkane blowing agent having atmospheric boiling temperature of −40° F to 200° F; |
| 0.01–0.1 | Surfactant; |
| 0.2–0.4 | Acid curing catalyst. |

EXAMPLE I

A phenol-aldehyde foam product was fabricated by combining the following materials.

Part A — Resin Ingredient 68.8 parts by weight phenolic resol obtained from Schenectady Chemical Company, HRJ 333;

21 parts by weight Freon TF 113, which is CClF$_2$-CCl$_2$F, a halogenated alkane blowing agent obtained from E. I. du Pont de Nemours Company;

3.4 parts by weight silicon surfactant, General Electric Company 1400;

6.8 parts by weight Methylon 75108 obtained from General Electric Company, an allyl ether of methylol-substituted phenol.

Part B - Catalyst

A catalyst was prepared by combining 80.2 parts by weight of a liquid state paratoluene sulfonic acid sold under the trade name Ultra-TX by Witco Chemical Company;

19.8 parts by weight distilled water.

In order to prepare the foamed phenolic resin, 86.1 parts by weight of Part A was combined with 13.9 parts by weight of Part B. The material is mixed for 45 seconds and allowed to cream for 90 seconds. The material is poured into a free rise, open top, wood mold measuring 2 feet by 2 feet by 2 inches high. The resin becomes tacky in 150 seconds and rises in about 240 seconds. The product has a density ranging from 1.1 to 1.3 pounds per cubic foot. The closed cell content is 5 to 10 percent. The K factor (insulation value) is 0.22–0.25 BTU-inch/hour-square foot-° F. The tensile strength is 2.5 to 2.0 psi and the compressive strength is 4.0 to 8.0 psi.

The foam product has less friability than a phenolic aldehyde foam product prepared from the identical materials without including the allyl ether of methylolated phenol. The foam product of EXAMPLE I contained 9.88 percent by weight of allyl ether of methylolated phenol based on the weight of the phenol-aldehyde resol.

EXAMPLE II

A phenol-aldehyde foam was fabricated by combining the following materials:

Part A — Resin Ingredient 100 pounds phenolic resol obtained from Schenectady Chemical Company, HJR 590;

3 pounds demineralized water;
20 pounds Methylon 75108, supra;
5 pounds silicone surfactant, General Electric Company 1400;
10 pounds Freon 113 which is $CCl_2F$-$CClF_2$, supra;

Part B — Catalyst 15 pounds of a mixture containing
1 pound ammonium phosphate ($NH_4H_2PO_4$);
1.5 pounds water;
2.5 pounds phosphoric acid;
10.0 pounds liquid state toluene sulfonic acid, supra.

Part A and Part B were mixed for 30 seconds and poured into a mold where a cure was achieved in 15 minutes at 130° F. The foam had the following properties:

Density — 3.79 p.c.f.
Closed Cells — 7%
Tensile Strength — 35.3 psi
Compressive Strength — 29.9 psi The EXAMPLE II foam contained ammonium phosphate as an anti-punking additive. The EXAMPLE II foam exhibited less friability than a corresponding density foam prepared from the same phenolic resol without accompanying allyl ether of methylol-substituted phenol.

Catalyst

The present products are prepared by employing an acidic condensation catalyst which can be any strong acid diluted with water, for example hydrochloric acid, sulfuric acid, phosphoric acid or p-toluene sulfonic acid.

Cell Control Agent

Any surface active agent which lowers system surface tension and allows for ease of bubble formation can be employed as the cell control agent. While this is normally a silicone surfactant, it is possible to employ a polyethylene ether of sorbitol as the cell control agent.

Blowing Agent

In addition to halogenated alkane blowing agents it is possible to employ sodium bicarbonate or volatile solvents such as isopropyl ether. The preferred blowing agent is a halogenated alkane having an atmospheric boiling temperature from —40° F to 200° F. In general, the amount of blowing agent is the principal determinant of the resulting foam density.

It is believed that the allyl ether of methylol-substituted phenol reacts chemically into the foam product and remains chemically bound in the final foam product.

Phenol-aldehyde foam, prepared as described in the foregoing example, was employed as a thermal insulation material in a building construction panel.

I claim:
1. A composition suitable for forming into a phenol-aldehyde foam product comprising:
  1. phenol-aldehyde resol;
  2. allyl ether of methylol-substituted phenol

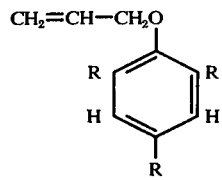

;
  3. halogenated alkane blowing agent having an atmospheric boiling temperature from —40° F to 200° F; and
  4. a surfactant;
  the amount of said allyl ether of methylol-substituted phenol ranging from 0.5 to 25 percent by weight of the said phenol-aldehyde resol.

2. The method of preparing a phenolic resin foam comprising preparing an admixture of 1 part by weight of (A) a mixture including
  1. 1 part by weight of phenol-aldehyde resol;
  2. 0.005 to 0.25 parts by weight of allyl ether of methylol-substituted phenol

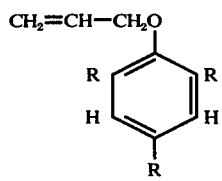

;
  3. 0.1 to 0.4 parts by weight of polyhalogenated saturated fluorocarbon having an atmospheric boiling temperature of —40° F to 200° F; and
  4. 0.01 to 0.1 parts by weight of a surfactant;
  and 0.1 to 0.2 parts by weight of (B) an acid curing catalyst for the said phenol-aldehyde resol; and curing the resulting admixture.

* * * * *

Disclaimer

4,018,725.—*John F. Hadley*, Bradford Woods, Pa. PHENOLIC FOAM PRODUCTS AND METHOD OF MAKING THE SAME. Patent dated Apr. 19, 1977. Disclaimer filed May 10, 1978, by the assignee, *H. H. Robertson Company*.

Hereby enters this disclaimer to claims 1 and 2 of said patent.

[*Official Gazette July 4, 1978.*]